United States Patent [19]
Allen et al.

[11] 4,191,380
[45] Mar. 4, 1980

[54] VIDEO DISC PLAYER HAVING UNITARY RECORD HANDLING PLATFORM CONSTRUCTION

[75] Inventors: James A. Allen, Monrovia; Leslie A. Torrington, Indianapolis, both of Ind.

[73] Assignee: RCA Corporation, New York, N.Y.

[21] Appl. No.: 964,537

[22] Filed: Nov. 29, 1978

[30] Foreign Application Priority Data

Feb. 13, 1978 [GB] United Kingdom ................ 5736/78

[51] Int. Cl.² ............................................. G11B 3/36
[52] U.S. Cl. ................................. 274/9 B; 274/13 R
[58] Field of Search ..................... 274/9 R, 9 B, 9 RA, 274/13 R, 14, 15 R, 23 A; 358/128; 360/97

[56] References Cited

U.S. PATENT DOCUMENTS

| | | | |
|---|---|---|---|
| 2,866,647 | 12/1958 | Somers | 274/14 |
| 3,802,710 | 4/1974 | Mazza | 274/9 B |
| 4,124,866 | 11/1978 | Coleman | 274/9 B |

*Primary Examiner*—John W. Shepperd

*Attorney, Agent, or Firm*—E. M. Whitacre; J. S. Tripoli; D. A. Kulkarni

[57] ABSTRACT

To load a record into a player, such as a video disc player, a record caddy is inserted into the player housing through an input slot. The player is equipped with rails for guiding caddy insertion along a path. A record extracting mechanism mounted in the player removes the enclosed record from the caddy during subsequent caddy withdrawal, whereby the record is retained in the player. A platform mounted in the housing is subject to motion between an elevated position and a depressed position. In the elevated position, the platform supports the retained record in the raised position. The retained record is transferred to a turntable for rotation therewith when the platform is depressed. The player is further equipped with a second set of rails for guiding a signal pickup carriage along a second path disposed parallel to the caddy path. A translating apparatus drives the pickup carriage along the carriage guide rails at a speed correlated to the speed of rotation of the turntable during playback. Both the caddy guiding rails and the carriage guiding rails are integrally secured to the platform.

4 Claims, 16 Drawing Figures

Fig. 1

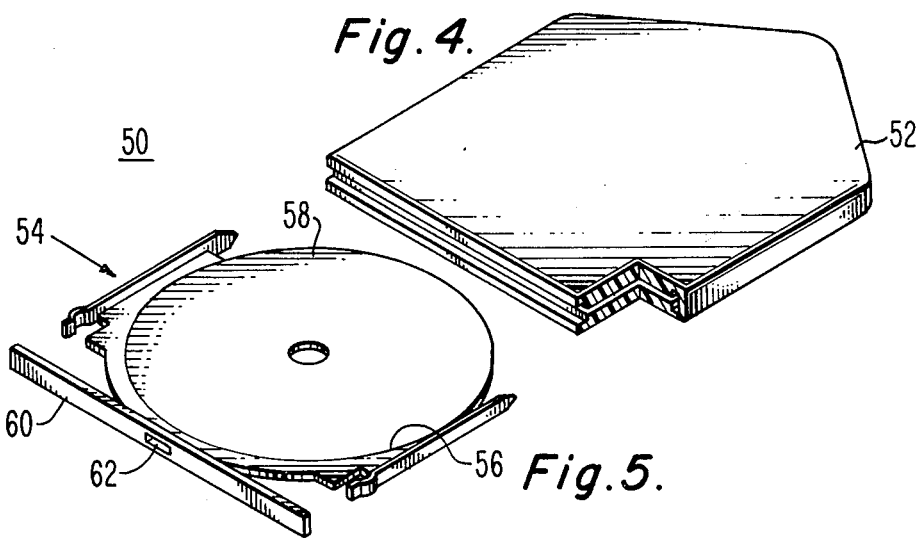
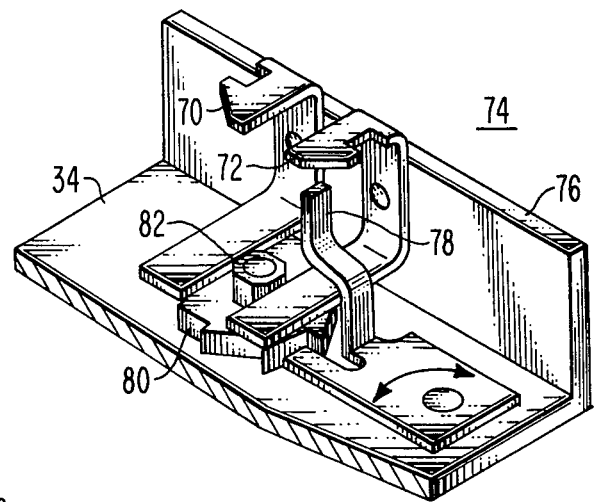
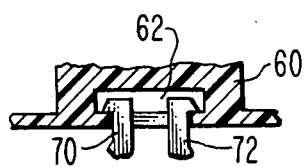
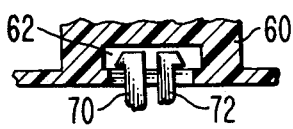
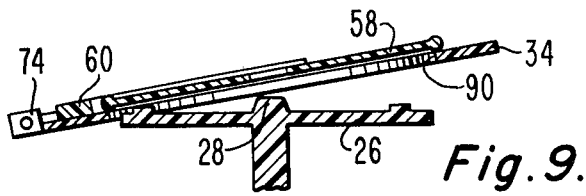
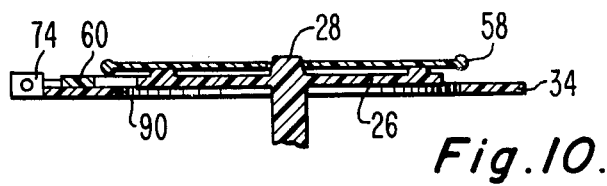

VIDEO DISC PLAYER HAVING UNITARY RECORD HANDLING PLATFORM CONSTRUCTION

This invention generally relates to record players, and more particularly, it relates to players suitable for use with a record caddy.

In certain video disc systems, information is stored on a disc record in the form of geometric variations in the bottom of a continuous spiral groove disposed on the record surface. The variations in capacitance between an electrode incorporated in a groove-riding stylus and a conductive coating disposed on the record surface are sensed to reproduce the stored information. A capacitance-type video disc system is illustratively disclosed in U.S. Pat. No. 3,842,194 (Clemens).

In such systems, it is advantageous to mount a groove-riding pickup stylus in a demountable cartridge. The player is provided with rails for guiding a carriage, having a compartment for receiving the pickup cartridge, along a path. The carriage is driven during playback along the carriage guiding rails in correlation with the motion of the groove-riding stylus. U.S. Pat. No. 3,870,320 (Torrington), discloses a type of carriage translating system.

It is beneficial to enclose a record in a thin plastic caddy. For record loading, an occupied caddy is inserted into an input slot provided in the player. The player is equipped with another set of rails for guiding caddy insertion along a further path. A record extracting mechanism disposed in the player removes the record from the caddy during subsequent caddy withdrawal, whereby the record is retained in the player. The player is equipped with a platform for supporting the retained record when it is disposed in an elevated position. The retained record is transferred to the turntable for playback during motion of the platform to a depressed position. For subsequent record retrieval, the platform, with the retained record resting thereon, is raised, and an empty caddy is inserted into the player, thereby returning the record back into the caddy. Withdrawal of the caddy, effects record removal from the player. U.S. Pat. No. 4,098,511 (Leedom), and patent applications, Ser. Nos. 747,729 now U.S. Pat. No. 4,124,866 (Coleman) and 801,604, now U.S. Pat. No. 4,133,546 (Torrington), illustrate systems suitable for use with a record caddy. The above patent and applications are assigned of record to the assignee of the instant application.

In such systems, the carriage is typically mounted for side-to-side motion and the direction of caddy insertion is from front-to-back, a direction which is orthogonal to the carriage path. Such configuration imposes several constraints on player design and construction: for example, it is necessary that the starting position of the carriage is beyond the record periphery, one of the caddy guiding rails is mounted on the carriage to prevent interference thereof with the motion of the carriage toward the record center; a separate mechanism is needed to return the carriage to the starting position subsequent to playback; and a stylus landing adjustment mechanism is necessary to insure that the stylus is lowered precisely over the beginning of the recorded band during travel of the carriage from an off-record starting position toward a position overlying the record.

In a concurrently filed, copending application of L. A. Torrington, entitled "VIDEO DISC PLAYER", a novel video disc player construction, which overcomes the hereinbefore mentioned constraints, is disclosed. In the therein disclosed system, the carriage is translated along a path disposed parallel to the path of caddy insertion. Pursuant to a further feature of the Torrington invention, the direction of translation of the carriage during playback is opposite to the direction of the caddy insertion. The location of the caddy path relative to the carriage path is such that the caddy engages the carriage, when the carriage is at a position other than at a starting position, during a caddy insertion to reset the carriage at the starting position. The Torrington application is assigned of record to the assignee of the instant case.

In accordance with the principles of the present invention, both the caddy guiding rails and the parallel carriage guiding rails are integrally mounted on the record retaining platform. Such an arrangement provides a precise alignment of the record caddy relative to the carriage and the carriage relative to the turntable throughout the operating range.

IN THE DRAWINGS:

FIG. 1 is a plan view of a video record player incorporating the principles of the present invention;

FIGS. 4 and 5 depict a record caddy, comprising a jacket and a record retaining member, suitable for use with the player of FIGS. 1-3;

FIG. 6 illustrates a record extracting mechanism disposed in the player of FIGS. 1-3;

FIGS. 7 and 8 show the operation of the record extracting mechanism of FIG. 6;

Figure 1:
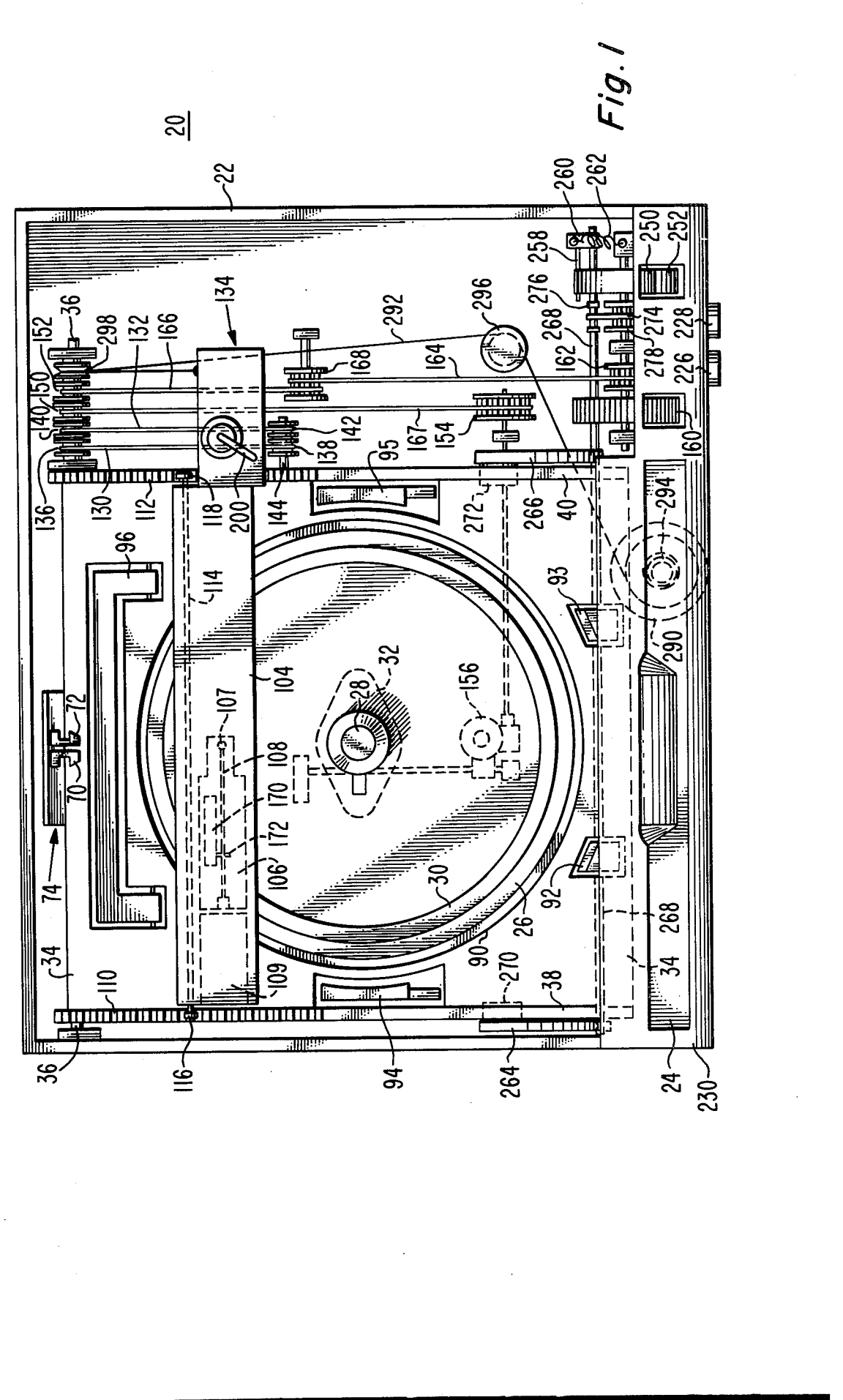
Figure 2:
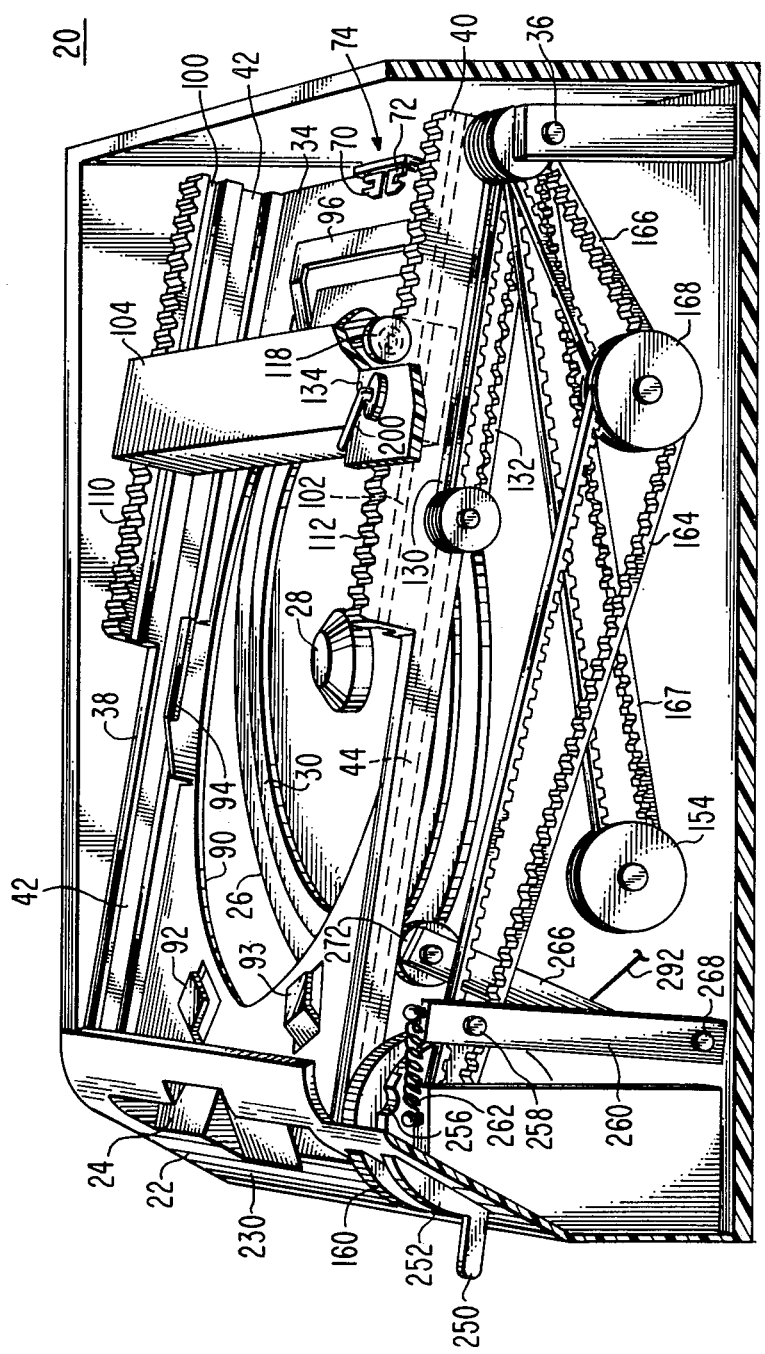
FIG. 2 is a perspective end view of the player of FIG. 1, with a depressible platform being shown in the raised position.
Figure 3:
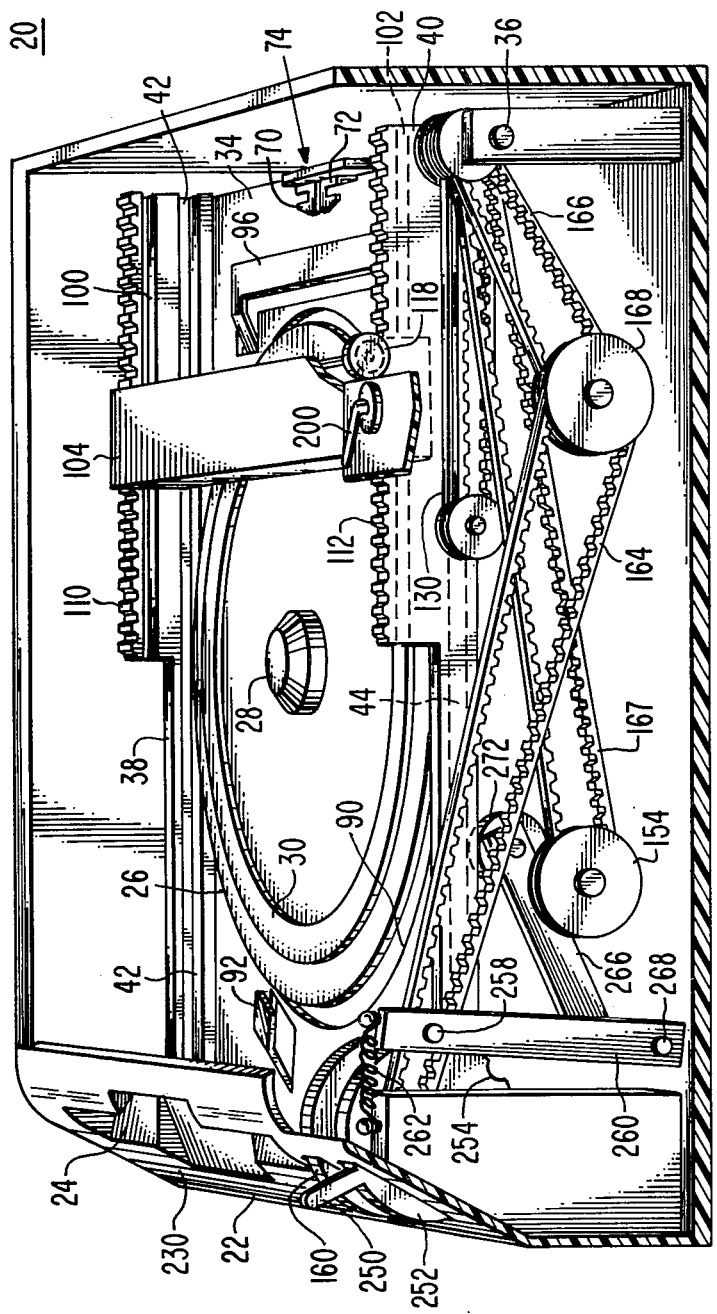
FIG. 3 is a perspective end view of the player of FIGS. 1 and 2, with the depressible platform being shown in the lowered position.
Figure 11:
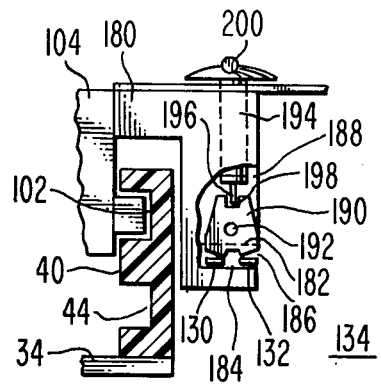
Figure 12:
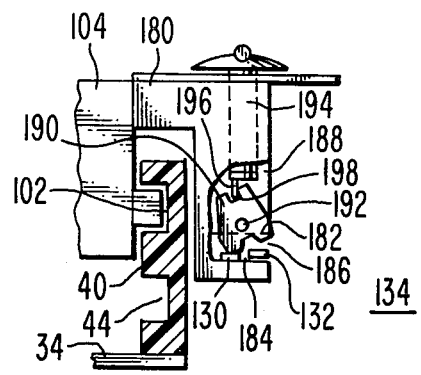
Figure 13:
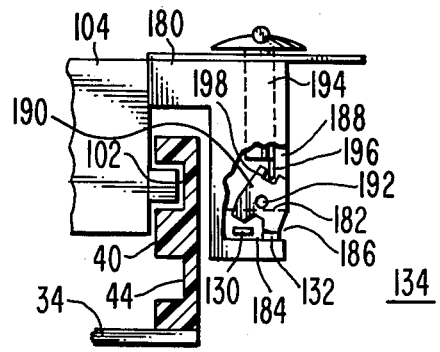
Figure 14:
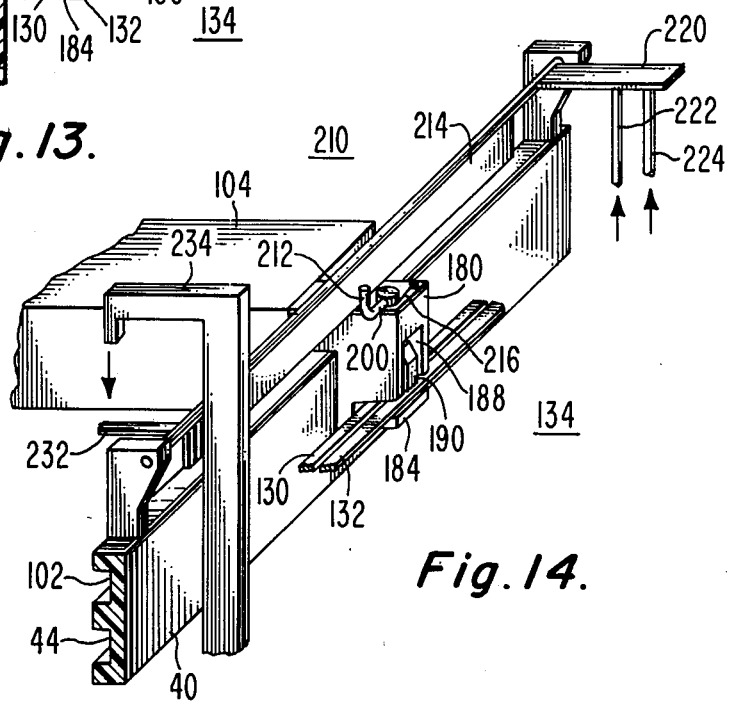
Figure 15:
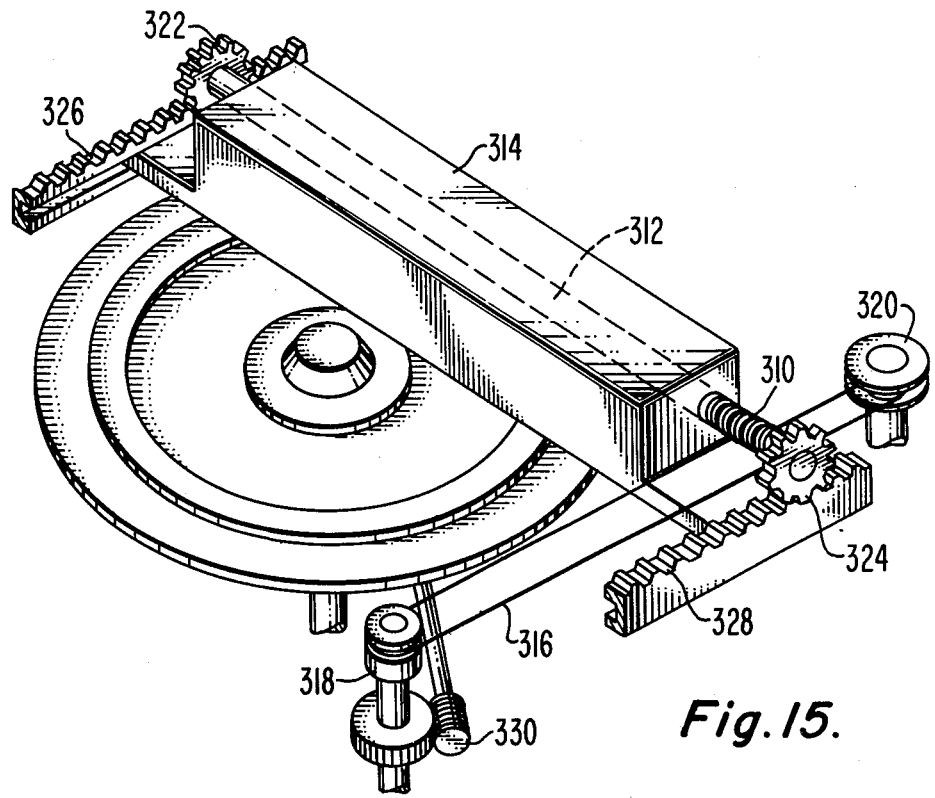
Figure 16:
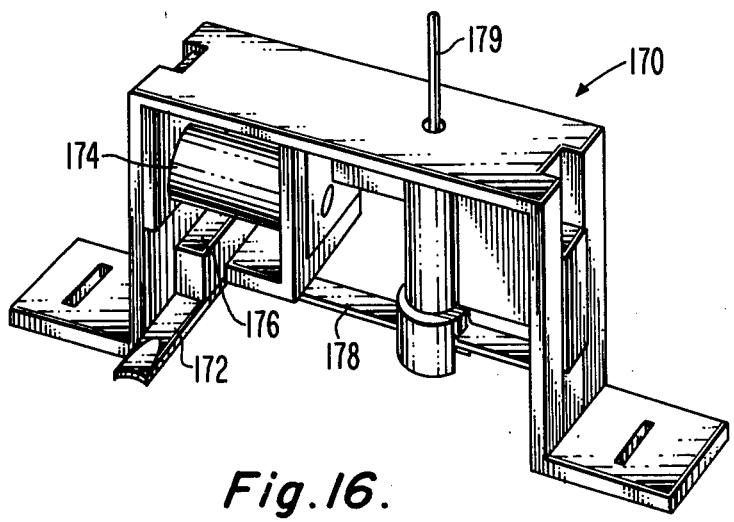

FIGS. 9 and 10 demonstrate the sequence involved in transferring a record, resting on the depressible platform of FIGS. 1-3, to the player turntable;

FIGS. 11-13 illustrate a mechanical toggle switch suitable for use with a pickup carriage translating mechanism provided in the player of FIGS. 1-3;

FIG. 14 shows an arrangement suitable for operating the toggle switch of FIGS. 11-13 by means of controls provided at the input end of the player;

FIG. 15 depicts an alternate carriage translating mechanism suitable for use with the player of FIGS. 1-3; and FIG. 16 illustrates a stylus lifting/lowering apparatus suitable for use with the player of FIGS. 1-3.

In FIGS. 1, 2 and 3, a video disc player 20 includes a housing 22 which is provided with an input slot 24 at the front end thereof, through which a record caddy is inserted for loading an enclosed record into the player. A turntable 26 includes a record centering spindle 28, and a soft annular pad 30 for supporting the record. The turntable diameter is made less than the record diameter, and the soft annular pad supports the record in the grooved area.

The turntable 26 is driven by a motor 32 (FIG. 1) to rotate at a predetermined speed within preset limits (e.g., 450 rpm±0.01%). U.S. Pat. No. 3,912,283 (Hammond, et al.), discloses an alternate form of a turntable drive system.

A platform 34, mounted on a shaft 36 which is located at the non-input end of the housing 22, is subject to motion between an elevated position (FIG. 2) and a depressed position (FIG. 3). A pair of rails 38 and 40 are disposed on the platform 34. The rails have grooves 42 and 44 for guiding insertion of a caddy into the housing along a path. The front ends of the caddy guiding grooves are aligned with the input slot 24 when the platform is occupying the elevated position for permitting insertion of a caddy into the player.

As shown in FIGS. 4 and 5, the record caddy 50 comprises an outer jacket 52 and a record retaining member 54 removably located within the jacket. The retaining member comprises (1) an annular portion 56, and encircles the enclosed record 58, and (2) a spine portion 60, which serves as a closure to keep dust and debris from entering the record enclosing cavity. The spine has an opening 62 into which the latch arms 70 and 72 of a record extracting mechanism 74 (FIG. 1) protrude during arrival of a record caddy at a fully inserted position in the player to effect record removal during subsequent caddy withdrawal.

The record extracting mechanism 74 is mounted on the platform 34. In the manner shown in FIG. 6, the extracting mechanism 74 includes latch arms 70 and 72 pivotally secured to a platform-mounted bracket 76. The latch arms are alternated between an open condition (FIGS. 6 and 7) and a closed condition (FIG. 8), in response to each caddy arrival at the fully inserted position in the player. The arrangement for rendering the extracting mechanism caddy responsive includes a pivotally-mounted actuating arm 78 disposed in the caddy path. The actuating arm advances a ratchet 80, carrying a square-shaped cam 82, through 45 degrees each time a cover arrives at a fully inserted position in the player. Each advancement of the square-shaped cam changes the condition of latch arms from the condition they occupied prior to cover insertion to the other condition thereof. Springs (not shown) are provided for returning the actuating arm to the rest position thereof, and to bias the latch arms into engagement with the square-shaped cam 82. A pawl (not shown) is provided to prevent the ratchet from rotating in the reverse direction when the actuating arm is returned to its rest position. U.S. Pat. No. 4,109,919 (Elliott, et al.), discloses a suitable caddy-actuated record extracting mechanism.

To load a record into the player, the latch arms 70 and 72 are disposed in the closed condition (FIG. 8), the platform 34 is disposed in the elevated position (FIG. 2) and an occupied caddy is inserted through the input slot 24 along the caddy guiding grooves 42 and 44. The latch arms enter the opening 62 in the spine 60 as the caddy reaches the fully inserted position in the player. The engagement of the caddy with the actuating arm 78 indexes the latch arms into the spread apart condition (FIG. 7), whereby the retaining member and the associated record are locked to the platform. Subsequent withdrawal of the caddy removes the record therefrom, thereby retaining the record in the player resting on the raised platform (FIG. 9). To transfer the retained record to the turntable, the platform is lowered to the depressed position (FIG. 10).

The record retrieval, the above sequence is reversed. The platform, with the record resting thereon, is raised (FIG. 9). The inner diameter of an opening 90 in the platform 34 is sufficiently less than the record diameter to positively insure lifting of the retained record during upward motion of the platform. The platform is provided with a set of depressible lifting pads 92, 93, 94, 95 and 96 (FIG. 1) to align the record resting thereon with the caddy guiding grooves 42 and 44 to cause return of the record into an empty caddy during insertion thereof into the player. As a caddy is loaded into the player, the leading edge thereof depresses the lifting pads to allow forward motion of the caddy. The engagement of the caddy with the actuating arm 78 reindexes the latch arms to the closed condition (FIG. 8), thereby freeing the record from the player. Subsequent caddy withdrawal removes the enclosed record therewith.

The rails 38 and 40 are further provided with a second set of grooves 100 and 102 (FIGS. 2 and 3) for guiding a carriage 104 along a second path parallel to the caddy path (front-and-back). The carriage is provided with a pair of projections (not shown), which are respectively received in the carriage guiding grooves.

A pickup cartridge 106, carrying a groove-riding stylus 107 at the end of a stylus arm 108, is installed in a compartment provided in the carriage 104 (FIG. 1). The carriage is translated during playback along the rails toward the turntable center (a direction opposite to the direction of caddy insertion) in correlation with the speed of rotation of the turntable in the manner hereinafter described. An armstretcher apparatus 109 oscillates the pickup stylus back-and-forth along the groove so as to offset cyclical errors in stylus/record relative velocity. U.S. Pat. No. 4,030,124 (Allen), discloses a pickup cartridge suitable for use with the player described herein. A suitable armstretcher apparatus is shown in U.S. Pat. No. 3,983,318 (Miller, et al.).

A pair of racks 110 and 112 are respectively secured to the platform rails 38 and 40. A shaft 114, carrying a set of pinions 116 and 118, is rotatably secured to the carriage 104 (FIG. 1). A respective one of the pinions engage a respective one of the racks to ensure that the carriage path lies radially of a turntable-supported record throughout the operating range thereof.

Prior to playback, the carriage is restored to a starting position. The resetting of the carriage to the starting position is done automatically when a caddy is inserted, for example, to retrieve a record, resting on the platform while it is disposed in the raised position, from the player. The location of the caddy path relative to the carriage path is such that a caddy engages the carriage during insertion thereof into the player. The player is dimensioned such that the arrival of the carriage-engaging caddy at the fully inserted position in the player coincides with the arrival of the engaged carriage at the starting position.

For playback, the platform, with a retained record resting thereof, is depressed to transfer the record to the turntable. The carriage is translated during playback along the rails in a direction opposite to the direction of caddy insertion in correlation with the speed of rotation of the turntable. In addition to normal correlated translation of the carriage during playback, the carriage is translatable in either direction at a speed independent of the speed of rotation of the turntable during active search.

The carriage drive mechanism includes an endless plat belt 130, an endless search belt 132 and a carriage-mounted, mechanical toggle switch 134 (FIG. 1). The toggle switch selectively connects one of the two belts to the carriage to effect carriage translation by a selected one of the belts. The play belt is driven in correlation with the turntable rotational speed, and in a direction causing carriage translation toward the record center. The search belt is driven independent of the turntable rotational speed, and in either direction. The belts are driven in the manner described hereinafter. The play belt is disposed about a pair of pulleys 136 and 138, and the search belt is disposed about an additional set of pulleys 140 and 142. Pulleys 136 and 140 are loosely mounted on the platform shaft 36 for motion independent thereof. The other pulleys 138 and 142, serving as idling members, are freely mounted for rotation about a pin 144 secured to the platform 34, and extending parallel to the platform shaft 36. The respective locations of the pulleys are such that the belts lie along a path parallel to the carriage path.

The mechanisms for driving the two belts will now be described. As shown in FIG. 1, a turntable-driven pulley 150 and a thumbwheel-driven pulley 152 are also loosely mounted on the platform shaft 36 for motion independent thereof. The play belt driving pulley 136 and the search belt driving pulley 140 are respectively secured to the turntable-driven pulley 150 and the thumbwheel-driven pulley 152 for rotation therewith.

The turntable-driven pulley 150 is coupled to a pulley 154 which, in turn, is driven by the turntable drive motor 32 via a drive chain 156. The selection of proper gear ratios permits carriage translation in correlation with the radial motion of the groove-riding stylus during playback.

A serrated thumbwheel 160 is rotatably mounted in the housing 22, and has a portion, which is accessible to the user of the player through a slot in the front instrument panel 230 of the player. A pulley 162 is mounted coaxially with the thumbwheel for rotation therewith. The coaxially mounted pulley drives the thumbwheel-driven pulley 152 by means of endless belts 164 and 166 via an intermediate pulley 168. It will be seen that the speed of the bidirectional search belt is continuously variable over a range of speeds in either direction by utilizing the manually-actuated thumbwheel. All of the endless belts and the pulleys herein used are equipped with teeth to provide nonslip coupling.

An apparatus 170 (FIGS. 1 and 16) for causing motion of the pickup stylus between a lowered position, permitting engagement between the stylus and a turntable-supported record, and a raised position, precluding stylus/record engagement, is mounted in the carriage 104. The pickup stylus is lowered for engagement with a turntable-supported record during playback and active search. The pickup stylus is raised when the player is in a pause mode and when the carriage reaches an end-of-play position.

Essentially, as shown in FIG. 16, the stylus lifting/lowering apparatus 170 includes a stylus arm rest 172 mounted for motion between an elevated position and a depressed position. The stylus arm rest in the elevated position supports the stylus arm 108 (FIG. 1) in a manner precluding stylus/record contact. The stylus arm rest in the depressed position permits the stylus arm to occupy a lowered position. The lowered position of the stylus arm is such that the stylus/record contact is established when the carriage is in the over-record play position. An electromagnet 174 is energized to repel a permanent magnet 176 secured to the stylus arm rest to dispose the stylus arm rest in the depressed position. A leaf spring 178 secured to the stylus arm rest lifts the stylus 107 off the record when the electromagnet is de-energized. A selectively actuated plunger 179 depresses the stylus arm rest when actuated. U.S. Pat. No. 4,053,161 (Bleazey, et al.), discloses such stylus lifting/lowering apparatus.

Disposed in the carriage are pickup circuits coupled to the output of the groove-riding stylus for developing a signal representative of the information stored on the turntable-supported record. Signal processing circuits, coupled to the output of the pickup circuits, are located in the housing for developing a signal suitable for application to a television receiver for audio/visual presentation of the ifnormation stored on the record. U.S. Pat. No. 4,080,625 (Kawamoto, et al.), discloses suitable pickup circuits. U.S. Pat. No. 4,097,889 (Yu), illustratively describes signal processing circuits.

To obtain various special effects, the mechanical toggle switch 134 is thrown into an active search mode to connect the carriage to the variable speed, bidirectional search belt 132 to the exclusion of the constant speed, unidirectional play belt 130. It will be noted that in the active search mode, as well as in the play mode, the stylus lifting/lowering apparatus permits stylus/record engagement. To realize, for example, fast forward motion, the carriage is translated at a rapid rate in the forward direction by rotating the thumbwheel 160 at appropriate speed in the required direction, while the stylus is allowed to ride on the record. The reverse motion can be obtained by translating the carriage in the reverse direction (i.e., away from the turntable center or toward the starting position). To obtain stop motion effect, the carriage is allowed to remain stationary, thereby causing the groove-riding stylus to repetitively trace a selected set of groove convolutions.

The mechanical toggle switch 134 for selectively coupling the carriage to one of the two belts to effect carriage translation by a chosen one of the belts will now be described. FIGS. 11, 12 and 13, respectively, illustrate (1) the pause mode, wherein the carriage-mounted toggle switch is disconnected from both belts, (2) the play mode, wherein the toggle switch is secured to the play belt 130, and (3) the search mode, wherein the toggle switch is connected to the search belt 132.

The toggle switch includes a block 180 secured to the platform-mounted carriage for translation therewith. The block has a pair of surfaces 182 and 184 defining a slot 186 through which the upper runs of the play and the search belts pass. The block is equipped with a recess 188 in communication with the top surface 182. A bifurcated plate 190 is mounted in the recess for arcuate motion about a pin 192 to selectively occupy the above-mentioned three positions. In the play mode, the upper run of the play belt 130 is squeezed between the toggle plate and the bottom surface 184 (FIG. 12). In the search mode, the upper run of the search belt 132 is held between the toggle plate and the bottom surface 184 (FIG. 13). In the pause mode, the carriage is freed from both belts (FIG. 11).

The switch actuating mechanism includes a pin 194 rotatably secured to the carriage-mounted block. An eccentric protrusion 196 is disposed at one end of the pin 194 for reception in a cutout 198 provided in the toggle plate 190. The position and orientation of the pin 194 relative to the toggle plate is such that the rotation of the pin effects pivotal motion of the toggle plate. A mode select lever 200 is secured to the pin 194 to selectively dispose the toggle plate in a selected one of the modes.

It is advantageous to be able to operate the toggle switch by means of controls provided at the input end of the player. One such arrangement 210 is illustrated in FIG. 14. As shown therein, the mode selection lever 200 is curled upward at the free end thereof to provide an offset tab 212. A flap 214 is swingably mounted on the platform for arcuate motion about an axis lying parallel to the carriage path. A torsional spring 216 is provided to bias the mode selection lever to occupy an extreme position adjacent to the flap, whereby the carriage 104 is connected to play belt 130. The flap is rotated to a first extent (corresponding to the midway position of the toggle plate 190) and a second extent (corresponding to the other extreme position of the toggle plate) in anti-clockwise direction (when viewed from the input end) to, respectively, set the toggle switch in the pause mode, wherein the carriage is released from both belts, and the search mode, wherein the carriage is under the influence of the search belt 132.

An extension 220 is disposed on the flap 214 at the non-input end of the player for cooperation with struts 222 and 224. The struts 222 and 224 are actuated, respectively, by a pause button 226 and a search button 228 (FIG. 1) to cause the flap to, respectively, rotate to the first and the second extent. Thus, operation of the pause button and the search button indexes the toggle switch, respectively, into the pause mode and the search mode. The mode selection buttons are disposed on the front instrument panel, and are of push-on/push-off variety.

The flap 214 is additionally equipped with a second extension 232 at the input end of the player for cooperation with a stationary overhanging member 234. The relative location of the stationary member is such that, when the platform 34 is raised to the elevated position, the stationary member depresses the second extension 232 to an extent that disposes the toggle switch into the pause mode, thereby freeing the carriage from both belts. Thus, the action of the stationary member on the flap when the platform is raised allows restoration of the carriage to the starting position, with freedom from interference by the carriage translating mechanism, during insertion of an empty caddy into the player for record retrieval.

The platform lifting/lowering mechanism will now be described in conjunction with FIGS. 1-3. A function selection lever 250 secured to a rotatably mounted wheel 252, extends through a slot provided in the front instrument panel of the player. The function selection lever is moved to the positions shown in FIGS. 2 and 3, respectively, to raise and lower the platform. In the raised position of the platform, the front ends of the caddy guiding grooves 42 and 44 are aligned with the input slot to permit caddy insertion and extraction. The depression of the platform, with a retained record resting thereon, effects transfer of the retained record to the turntable for playback. The function selection lever may also serve to shut off power to the player, for example, when it is shifted to a position beyond the caddy in/out position (FIG. 2).

The function selection wheel is provided with peripheral, axial notches 254 and 256 corresponding to the raised and lowered position of the platform. A detent 258, secured to a pivotally mounted lever 260, is received in one of the notches to releasably hold the function selection wheel in a selected one of the positions thereof. A spring 262 urges engagement between the detent and the periphery of the function selection wheel 252.

The linkage between the function selection lever and the platform includes a pair of spaced levers 264 and 266 secured to a rotatably mounted shaft 268. A set of platform-engaging rollers 270 and 272 are respectively disposed at the free ends of the spaced levers. As shown in FIG. 1, an endless toothed belt 274 is disposed about a toothed pulley 276, securely mounted on the shaft 268, and another toothed pulley 278, mounted coaxially with the function selection wheel for rotation therewith. The relative angular location of the spaced levers 264 and 266 is such that the motion of the function selection lever between the two positions causes corresponding motion of the platform between the elevated and the depressed position.

A rotatably-mounted dial 290 (FIG. 1), bearing an indicia indicative of the respective playing times associated with distance traveled by the carriage from a starting position, is visible through a readout window provided in the front instrument panel of the player. A cord 292 extends between the carriage 104 and the indicia bearing dial such that the displacement of the carriage along the guiding rails effects synchronized rotation of the dial. A torsion spring 294 is disposed about the axis of rotation of the dial such that it gets coiled during translation of the carriage away from the starting position, whereby energy is stored in the torsion spring. The coiled spring applies a force to the carriage in a sense urging carriage travel toward the starting position. The applied force aids resetting of the carriage to the starting position, when it is at a position other than the starting position, during a caddy insertion. The cord 292 is passed over a grooved pulley 296 and another grooved pulley 298. The pulley 298 is coaxially mounted on the platform shaft. One end of the cord is fastened to the carriage-mounted block 180, and a portion at the other end thereof is wrapped around the stem portion of the dial. The stiffness of the torsion spring is selected to give the desired feel to the user of the player as he inserts a caddy into the player to restore the carriage to the starting position.

An alternate carriage translating mechanism is shown in FIG. 15. As shown therein, a spiral groove 310 is disposed on the periphery of a shaft 312 rotatably secured to the carriage 314. A cord 316 has a portion wrapped around the carriage shaft along the spiral groove therein. The cord, moreover, has further portions respectively passing over a grooved, turntable-driven pulley 318 and an idler pulley 320. A pair of pinions 322 and 324 are secured to the respective ends of the carriage shaft for engagement with platform-mounted racks 326 and 328. A drive chain 330 rotates the turntable-driven pulley at a speed such that the carriage is translated in synchronism with a pickup stylus riding in an information bearing track disposed on a turntable-supported record. For playing back variable pitch records, the diameter of the peripheral groove in the carriage shaft is varied in correspondence with the variation in the record pitch, thereby providing precise carriage translation throughout the operating range.

The input slot is covered with a flap for keeping dust and debris from entering the record chamber in the player. When the player is disposed in the caddy in/out mode (FIG. 2) by means of the function selection lever, the flap uncovers the input slot to allow caddy insertion and extraction. In other modes of the player, the flap remains closed.

It will be noted that both the caddy guiding grooves and the carriage guiding grooves are integrally molded with the platform to provide a single-main-frame construction. This permits a precise positioning of the caddy relative to the carriage and the carriage relative to the turntable throughout the operating range.

The mounting of the play belt driving pulley 136, the search belt driving pulley 140, the turntable-driven pulley 150, the thumbwheel-driven pulley 152 and the grooved pulley 298 on the platform shaft 36 permits the platform motion without disturbing the rest of the player system.

Filed concurrently herewith are the following U.S. patent applications:, Ser. No. 964,531, (1) application of L. A. Torrington, entitled "VIDEO DISC PLAYER", (2) application, Ser. No. 964,536, of J.A. Allen, entitled "CARRIAGE TRANSLATING APPARATUS FOR VIDEO DISC PLAYER", (3) application, Ser. No. 964,534, of F. R. Stave, entitled "VIDEO DISC PLAYER HAVING MANUAL SCANNING FACILITY", (4) application, Ser. No. 964,535, of F. R. Stave, entitled "APPARATUS FOR FACILITATING CARRIAGE RETURN IN VIDEO DISC PLAYER", (5) application, Ser. No. 964,532, of F. R. Stave, entitled "VIDEO DISC PLAYER HAVING RECORD SIDE IDENTIFICATION APPARATUS", (6) application, Ser. No. 964,533, of C. F. Coleman, entitled "VIDEO DISC PLAYER HAVING MODULAR CONSTRUCTION", (7) application, Ser. No. 964,530, of L. A. Torrington, entitled "MANUAL SCANNING MECHANISM FOR VIDEO DISC PLAYER", (8) application, Ser. No. 964,529, of L. D. Huff, entitled "TOGGLE MECHANISM FOR VIDEO DISC PLAYER", (9) application, Ser. No. 964,528, of L. A. Torrington, entitled "RECORD SIDE IDENTIFICATION APPARATUS FOR VIDEO DISC PLAYER", (10) application, Ser. No. 964,527, of L. A. Torrington and L. D. Huff, entitled "CONSTANT DRAG CARRIAGE TRANSLATING MECHANISM FOR VIDEO DISC PLAYER", (11) application, Ser. No. 964,526 of L. A. Torrington and L. D. Huff, entitled "MECHANISM FOR AIDING CARRIAGE RETURN IN VIDEO DISC PLAYER", (12) application, Ser. No. 964,633, of L. A. Torrington, entitled "VIDEO DISC PLAYER HAVING ADJUSTABLE END-OF-PLAY SWITCH", and (13) application, Ser. No. 964,643, of C. F. Coleman and N. L. Farley, entitled "CADDY-ACTUATED DECLUTCHING MECHANISM FOR VIDEO DISC PLAYER".

Reference may be had to these applications for explanation of video disc player features that may advantageously be employed with the present invention.

What is claimed is:

1. A player for use with a disc record removably subject to occupancy of a protective caddy; said player comprising:
   (A) a housing having an input slot into which a caddy is inserted;
   (B) means for guiding caddy insertion into said housing along a path;
   (C) a turntable for centering and rotatably supporting a record;
   (D) means for removing a record from a caddy during caddy withdrawal subsequent to arrival of a record-carrying caddy at a fully inserted position in said housing, whereby a record is retained in said housing upon conclusion of such caddy withdrawal;
   (E) a platform mounted in said housing subject to motion between an elevated position and a depressed position (1) for supporting a retained record while occupying said elevated position, and (2) for effecting transfer of said retained record to said turntable during its motion toward said depressed position;
   (F) a signal pickup for recovering prerecorded information from a turntable-supported record during playback;
   (G) a carriage for supporting said signal pickup;
   (H) means for guiding said carriage in said housing along a second path lying parallel to said path of caddy insertion;
   (I) means coupled to said carriage for selectively translating said carriage during playback along said guiding means away from a starting position in correlation with the rotation of said turntable; and
   (J) means for fixedly mounting said caddy guiding means and said carriage guiding means on said movable platform.

2. A player in accordance with claim 1 wherein said caddy guiding means and said carriage guiding means are structurally integral.

3. A player in accordance with claim 1 wherein said caddy guiding means, said carriage guiding means and said platform are all structurally integral.

4. A player for use with a disc record removably subject to occupancy of a protective caddy; said player comprising:
   (A) a housing having an input slot into which a caddy is inserted;
   (B) means for guiding caddy insertion into said housing along a path;
   (C) a turntable for centering and rotatably supporting a record;
   (D) means for removing a record from a caddy during caddy withdrawal subsequent to arrival of a record-carrying caddy at a fully inserted position in said housing whereby a record is retained in said housing upon conclusion of such caddy withdrawal;
   (E) a platform mounted in said housing subject to motion between an elevated position and a depressed position (1) for supporting a retained record while occupying said elevated position, and (2) for effecting transfer of said retained record to said turntable during its motion toward said depressed position;
   (F) a signal pickup for recovering prerecorded information from a turntable-supported record during playback;
   (G) a carriage for supporting said signal pickup;
   (H) means for guiding said carriage in said housing along a second path lying parallel to said path of caddy insertion;
   (I) means coupled to said carriage for selectively translating said carriage during playback along said guiding means away from a starting position in correlation with the rotation of said turntable; and
   (J) means for fixedly mounting said caddy guiding means and said carriage guiding means on said movable platform;
   wherein said platform is pivoted about an axis, which is located toward the end of said housing remote from said input slot, for arcuate motion between said elevated position and said depressed position; wherein said carriage translating means includes an endless belt disposed about a pair of spaced pulleys; one of said spaced pulleys being rotatably mounted coaxially with said platform axis; the other of said spaced pulleys being secured to said platform for rotation about a second axis disposed parallel to said platform axis; the location of said pulleys relative to said platform being such that said endless belt is disposed parallel to said paths; wherein said carriage translating means further includes means for connecting said endless belt to said carriage.

* * * * *